United States Patent
Laflamme

(10) Patent No.: US 6,422,931 B1
(45) Date of Patent: Jul. 23, 2002

(54) FIXTURE APPARATUS AND SYSTEM

(76) Inventor: Robert Laflamme, 945 Scenic Rd., Laconia, NH (US) 03246-9323

(*) Notice: Subject to any disclaimer, the term of this patent is extended or adjusted under 35 U.S.C. 154(b) by 0 days.

(21) Appl. No.: 09/829,370

(22) Filed: Apr. 9, 2001

(51) Int. Cl.$^7$ ............................................... B24B 41/06
(52) U.S. Cl. ....................................... 451/365; 451/231
(58) Field of Search ................................. 451/364, 365, 451/367, 405, 406, 407, 44, 48, 431, 432; 144/306, 307; 269/136, 138, 153, 157, 234

(56) References Cited

U.S. PATENT DOCUMENTS

| | | | |
|---|---|---|---|
| 4,958,818 A | * 9/1990 | Buenter | 269/138 |
| 5,226,637 A | * 7/1993 | Kitaura et al. | 269/234 |
| 5,718,420 A | * 2/1998 | Bernstein | 269/136 |
| 5,921,847 A | * 7/1999 | Laflamme | 451/48 |
| 6,120,364 A | * 9/2000 | Laflamme | 451/380 |

* cited by examiner

*Primary Examiner*—Timothy V. Eley
*Assistant Examiner*—Dung Van Nguyen

(74) *Attorney, Agent, or Firm*—Michael J. Persson; Lawson, Philpot & Persson, P.C.

(57) ABSTRACT

A fixture apparatus and system. The fixture apparatus includes a base plate. A clamp block extends from the base plate and has a clamp surface disposed at a first angle from the top surface of the base plate. A locator block extends from the base plate and includes a locator surface disposed opposite the clamp surface of the clamp block. An alignment means is provided for aligning the workpiece relative to the locator surface of the locator block. A clamp wedge is disposed between the clamp surface and the locator surface. The clamp wedge includes a drive shaft, a bearing surface and a wedge surface disposed at a second angle relative to the bearing surface. The second angle of the wedge surface is complimentary to the first angle of the clamp surface such that the wedge surface is substantially parallel to the locator surface. A drive means is provided for extending and retracting the clamp wedge. When the clamp wedge is retracted, the clamp surface applies both a downward force against the work piece, which pushes the workpiece against the alignment means, and a lateral force against the work piece, which pushes the workpiece against the locator surface of the clamp block, effectively securing the workpiece in the desired position.

27 Claims, 17 Drawing Sheets

30

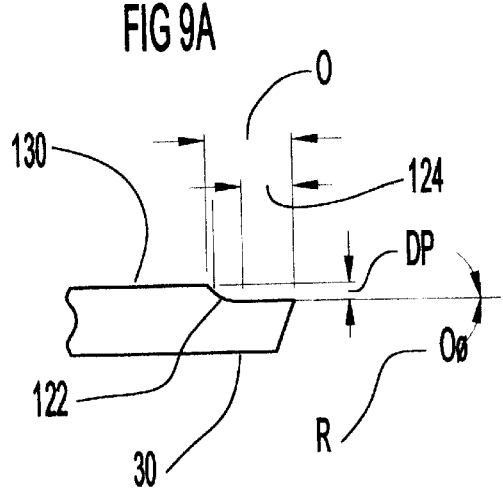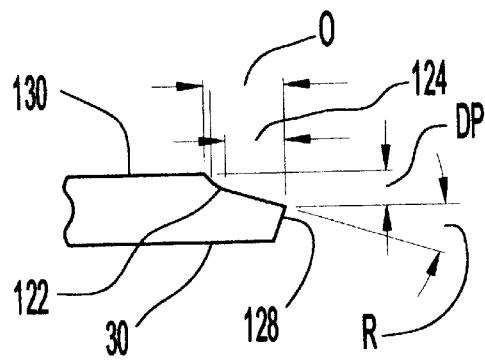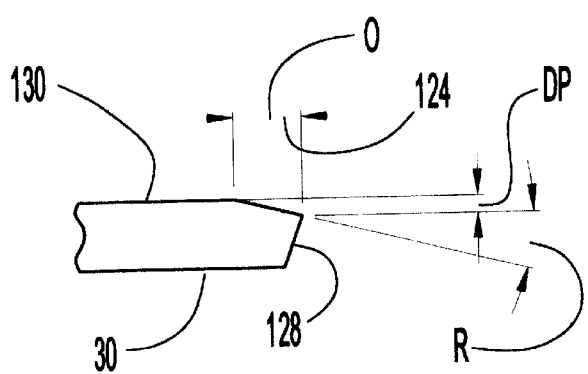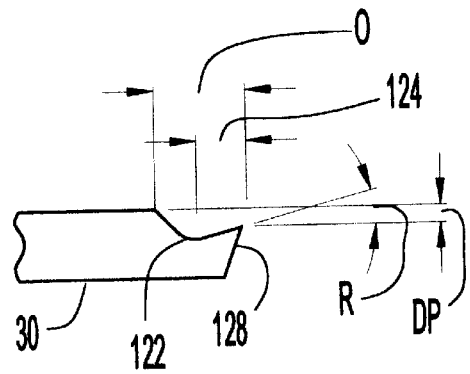

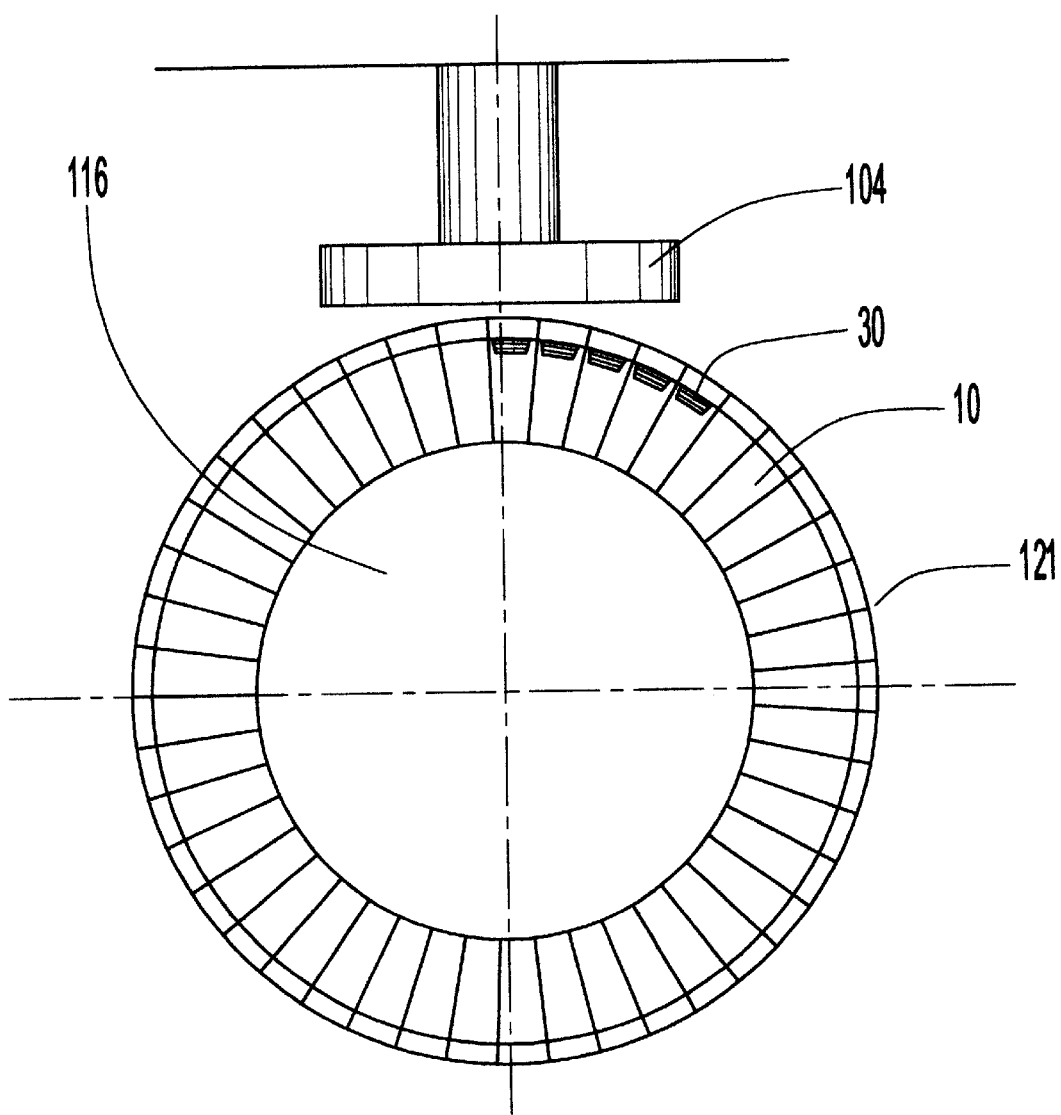

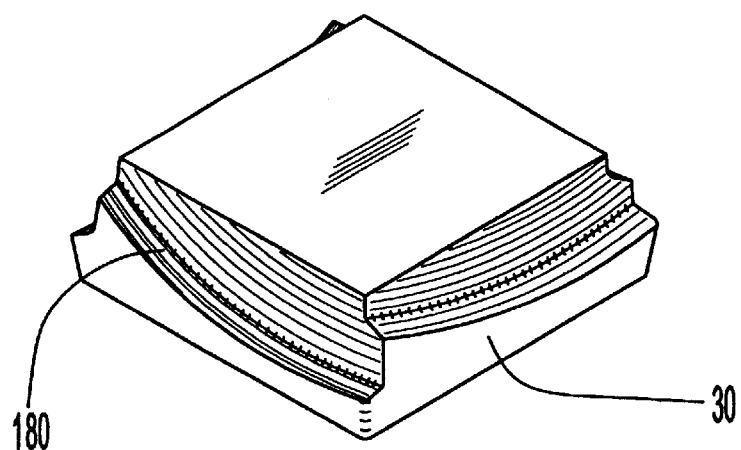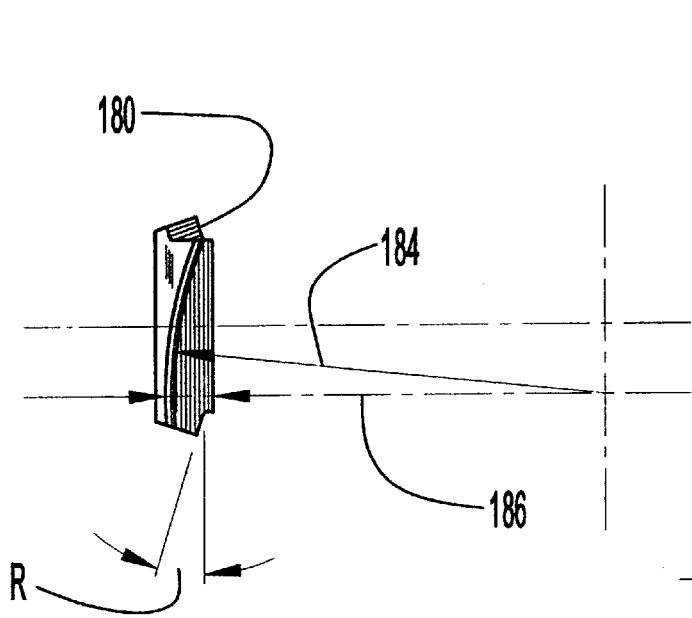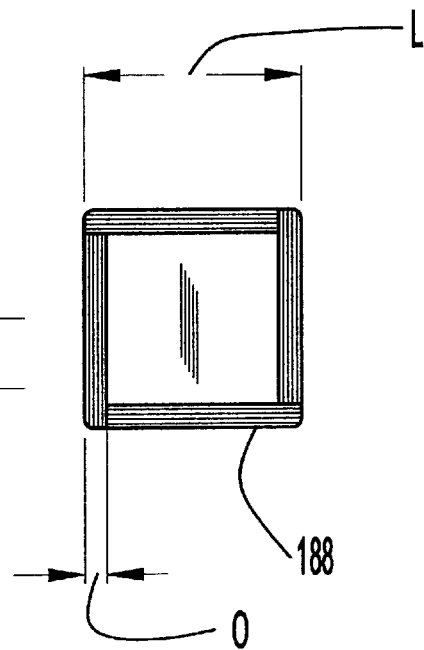

FIXTURE APPARATUS AND SYSTEM

FIELD OF THE INVENTION

The invention relates to the field of tool manufacturing and remanufacturing and, in particular, to a fixture apparatus for holding and manipulating a workpiece and a system utilizing the same.

BACKGROUND OF THE INVENTION

The use of cutting tools having replaceable cutting inserts began as long ago as 1917, when Fred P. Lovejoy invented the use of replaceable blades in order to obtain the economic advantages of having to replace the dull portion of the tool not the whole tool itself.

The next major improvement in this process was the invention of the tungsten titanium carbide insert by Philip M. McKenna in 1938, especially for use in milling machines. A typical milling machine is an apparatus that features a rotating mill head having a number of indexable cutting inserts, where the rotating head is passed over the workpiece to remove material from the workpiece.

Since the time of the invention of the carbide cutting insert, tremendous effort has been made to understand the myriad factors affecting the performance of cutting inserts. These factors include insert geometry, insert construction, temperature, cutting forces, workpiece material characteristics, and chip control. In fact, Kennametal, Inc. founded by Philip McKenna, lists thousands of insert geometry, size, composition, and coating combinations in order to meet the requirements of differing applications. Despite the overwhelming number of inserts that are available, standard inserts are still "standardized".

Inserts can be manufactured in various ways. The most common basic materials are tungsten carbide or tungsten titanium carbide combined with a metallic binder such as cobalt. It is also possible to construct inserts from ceramic material. These are referred to as Cermet. Various thin film coatings can be applied to the surface of the cutting insert. Examples of common thin film coatings are titanium nitride, aluminum oxide, chromium nitride, titanium carbo-nitride, titanium aluminum nitride and diamond. Coatings are used to improve the performance and durability of the insert. Each material/coating combination has a particular application to which it is most suited.

In addition to material choices, various basic geometric shapes can also be selected. The most common are the square, triangle, diamond rhomboid, rectangle, hexagon and round. Added to this complexity is a choice of fifteen different clamping options, five different cutting edge forms, dimension tolerance classification, insert thickness, etc,.

Some inserts have only one sharpened edge suitable for cutting. However, most indexable inserts have a plurality of cutting edges. Once a particular cutting edge has become dull, the insert is indexed in its holder to expose a new cutting edge. Until recently, it was widely held that an insert was useless once all of its cutting edges had been dulled. Accordingly, dulled inserts were typically discarded as scrap. The growing acceptance of remanufactured inserts has disproved the belief that dulled inserts are valuable only as scrap. In fact, inserts remanufactured using the present inventor's remanufacturing methods, disclosed and claimed in U.S. Pat. No. 5,957,755 and incorporated herein by reference, have found acceptance in industries, such as aerospace, automotive, toolmaking and heavy equipment, that had heretofore utilized only new cutting inserts. By remanufacturing their cutting inserts, companies have been able to customize their tools to achieve enhanced performance in their particular application, while realizing a significant cost saving on a per edge basis.

The remanufacturing process has typically involved clamping an insert into a single insert holder, sharpening one edge of the insert, unclamping and indexing the insert, and repeating this process until all edges of the insert are sharpened. Once the insert is completed, the insert is removed and another dull insert is completely sharpened. This process is advantageous for remanufacturing inserts in small quantities, as the time required for set-up is relatively low. However, the continuous unclamping and indexing required by this process is too time consuming to be cost effective when remanufacturing large quantities of the same insert. Given the widespread acceptance of remanufactured inserts, and corresponding increase in demand for these inserts, there is a need for a way to increase the volumes of inserts that are remanufactured.

In addition to the need for increased throughput of remanufactured inserts, experience has shown that certain geometries, such as the helical bias grinds disclosed in the inventor's U.S. Pat. Nos. 5,957,755 and 6,171,031, which is also incorporated herein by reference, are difficult, if not impossible, to mold into new inserts. Further, it has been found that users of ground inserts can achieve superior performance over new molded inserts due to the ability to achieve a keener edge and to inexpensively adjust top rakes to optimize the edge for a particular application.

One way to realize an increase in remanufacturing throughput and provide the advantages of a ground edge to both remanufactured and new inserts, is to purchase and operate sophisticated computer numerically controlled (CNC) grinding equipment. However, such a solution requires a significant capital investment in purchasing the necessary equipment. In addition, this equipment requires the retention of qualified programmers and operators, who are not found in abundance and, once found, must be paid relatively high salaries. This solution may be acceptable to large-scale manufacturers of new inserts but is generally not financially feasible for smaller scale manufacturers. Further, in order to maintain a cost advantage over new inserts, any machine for increasing remanufacturing throughput must be made at relatively low cost and must be operable by non-technical personnel.

A number of United States Patents address the problem of fixturing. However, each has significant drawbacks that make them unsuited to solve the present problem. For example, U.S. Pat. No. 5,226,637, titled "CLAMPING DEVICE", discloses a clamping fixture utilizing a driving mechanism for driving an input member toward the clamp main body, and a wedge type converting mechanism for converting a driving force supplied to the input member from the driving mechanism into a clamping force against the workpiece.

This clamping device is effective in some applications, but is ineffective at securely clamping inserts on a high volume basis. First, this clamping device uses a manually actuated clamping screw as the driving mechanism, requiring too much time for clamping, unclamping, and indexing. Further, the movable jaw is driven in a single direction to force the workpiece against a fixed jaw. This unidirectional clamping allows the workpiece to move upward between the jaws, preventing the workpiece from being positively seated and, consequently, from being ground to the exacting tolerances required for a remanufactured cutting insert to be effective. Finally, it is not adapted to clamp a variety of workpieces and, therefore, is of limited usefulness in remanufacturing.

Another fixture is disclosed in U.S. Pat. No. 5,056,766, titled "PRECISION MACHINE VICE". This patent describes a fixture that employs a fixed jaw and a moveable jaw and employs a series of notches in the base as a guide means to stabilize clamping. A pin engages, at its lower end, a guide with opposite flanges. The guide also has a central wedge with an arcuate load-bearing surface. The pin extends through a rotatable clamp disposed through an angling shoulder on the moveable jaw and into a chamber in the base for engagement with the guide means to insure precise positioning. Tightening the pin into the guide snugs the upper surface of the wedge, flange, or both, into engagement with the upper surface of the chamber of the base, causing the moveable jaw to move toward the stationary jaw.

As was the case with the patent described above, this device also uses a manually operable clamping screw and therefore requires excessive time to unclamp and index. In addition, this vice also produces a unidirectional clamping force that prevents positive positioning between the jaws. Accordingly, this vice is also ineffective at securely clamping inserts on a high volume basis.

Another fixture is described in U.S. Pat. No. 5,718,420, titled "WORKHOLDING WEDGE CLAMP". This patent discloses a device that uses a wedge actuator to move a slidable jaw. As with the previously mentioned patents the wedge is driven by a clamping screw and exerts a unidirectional clamping force on the workpiece. Accordingly, this fixture is also ineffective at securely clamping inserts on a high volume basis.

U.S. Pat. No. 4,958,818, titled "CLAMPING BLOCK", discloses a holder for use in partial machining tasks, or as a clamping means for exchangeable tools. This device is a variation of what is commonly referred to as a toe clamp and employs a fixed jaw and a movable jaw that is driven toward the fixed jaw via a drive screw. The top portion of the movable jaw has a number of teeth that contact the workpiece, and the movable jaw and stationary jaw have mating details along the base portion that prevent upward movement of the movable jaw once the workpiece is clamped.

As was the case with the other patents described herein, the clamping block of this patent has drawbacks that make it ill-suited for the present application. First, the use of a manual drive screw is time consuming. Second, lack of clearance between the bottom of the movable jaw and the base plate means that the teeth of the fixed jaws are adapted to provide a unidirectional clamping force upon the workpiece. Finally, the mating details required to prevent the upward movement of the movable jaw make this block prone to fouling by debris generated during the grinding process. This debris prevents positive locking of the clamp block and, therefore, the block requires frequent cleaning.

A fixture for remanufacturing cutting inserts that increases throughput, requires a relatively low up-front cost, is operable by non-technical personnel, reduces the overall time required for unclamping and indexing inserts, is effective at clamping inserts on a high volume basis, may be used for a wide variety of inserts, provides positive seating of an insert, allows the insert to be ground to exacting tolerances, and does not easily fill with debris, is not known in the art.

SUMMARY OF THE INVENTION

The present invention is a fixture apparatus for securing at least one cutting insert. In its most basic form, the apparatus includes a base plate having a top surface. A clamp block extends from the base plate and has a clamp surface disposed at a first angle from the top surface of the base plate. A locator block extends from the base plate and includes a locator surface disposed opposite the clamp surface of the clamp block. An alignment means is also provided for aligning the cutting insert relative to the locator surface of the locator block. A clamp wedge is disposed between the clamp surface of the clamp block and the locator surface of the locator block. The clamp wedge includes a top, a bottom, a drive shaft extending from the bottom and through the base plate, a bearing surface disposed against the clamp surface of the clamp block and in substantially parallel relation to the clamping shaft, and a wedge surface disposed at a second angle relative to the bearing surface. The second angle of the wedge surface is complimentary to the first angle of the clamp surface of the clamp block such that the wedge surface is disposed in substantially parallel relation to the locator surface of the locator block. Finally, a drive means is provided for extending and retracting the clamp wedge.

In operation, the clamp wedge is extended by the drive means. The cutting insert is then disposed against the locator surface of the locator block and aligned relative to the locator surface by the alignment means. The clamp wedge is then retracted such that the wedge surface of the clamp wedge securely holds the cutting insert in a predetermined location against the locator surface.

In the preferred embodiment of the present invention, the bottom surface of the base plate has an angled front portion to accommodate a pneumatic cylinder, which is the preferred drive means. This angled front is preferably perpendicular to the top of the pneumatic cylinder and is disposed at a complimentary angle relative to the clamp surface of the clamp block such that the clamping shaft is driven in substantially parallel relation to the clamp surface.

The preferred base plate is wider at its front than its rear and includes a pair of side walls that each form an eight degree (8°) angle from a plane formed by the centerline of the base plate. This arrangement is preferred as it allows multiple fixture apparati to be mounted to a rotary table. In other embodiments, however, base plates having substantially parallel sidewalls to allow multiple apparati to be mounted in a straight line arrangement.

The preferred base plate also includes an attachment means for attaching the base plate with an angle adjustment means, such as a sine base, riser block or incline table, that allows the rake angle of the insert to be varied. In the preferred embodiment, each base plate is attached to a single standard twelve inch sine base, which allows the rake angle of the insert to be varied between about minus fifteen degrees (−15°) and about twenty-five degrees (25°).

In the preferred apparatus, the clamp block and locator block are removably attached to the base plate in order to allow individual blocks to be replaced in the event that they are inadvertently damaged. However, in other embodiments the clamp block and locator block may be formed integral to the base plate. The preferred clamp block includes a pair of clamp rails that includes a pair of clamping surfaces that extend at an angle of approximately ten degrees (10°) from the top surface of the base plate. However, in other embodiments, the clamping surface may extend from about one degree (1°) to about forty-five degrees (45°) from the top surface of the base plate.

In the preferred embodiment, a stop assembly is attached to the clamp block for stopping the upward travel of the clamp wedge. The stop assembly is preferably adjustable such that the distance between the wedge surface of the clamp wedge and the alignment means is small enough to prevent inserts from inadvertently falling between the clamp wedge and the alignment means. This distance is approximately 0.030 inches in the preferred embodiment. The preferred stop assembly is a screw and locknut mounted within a notch in the top of the clamp rail of the clamp block.

The preferred locator block is disposed perpendicular to the base plate. In this embodiment, the alignment means includes a locator blade and a locator pin removably attached to, and extending from, the locator surface. The preferred locator blade has a thickness of approximately 0.110 inches thick and has a top surface that is segmented into two sections. The first section being substantially flat and the second being sloped downward at an angle of approximately twenty-five degrees (25°) relative to the horizontal plane. The preferred locator pin is a round pin having a cap that includes a flat portion along its edge and an angled portion disposed at a twenty degree (20°) angle to its shaft.

The preferred clamp wedge includes a wedge surface that is angled at ten degrees (10°) to correspond with the ten degree (10°) angle of the preferred clamping surface of the preferred clamp block. The preferred clamp wedge includes a threaded round drive shaft that is removably attached to the clamp wedge at one end and to a pneumatic cylinder, which is the preferred drive means, at the other.

The preferred apparatus also includes a cover assembly for covering the drive components such that they are protected from debris created during the remanufacturing process.

In its most basic form, the remanufacturing system of the present invention includes a grinding wheel and a horizontal grinding table. A fixture apparatus, as described above, is secured to the grinding table relative to the grinding wheel. A control means is in communication with the drive means of the fixture apparatus such that the drive means is caused to actuate the clamp wedge of the fixture at a desired time. In the preferred system, the control means is a pneumatic control that is in communication with pneumatic cylinders attached to a plurality of apparati. However, in other embodiments, such as those in which hydraulic or electromechanical drive means are utilized, other art recognized controls are provided.

Therefore, it is an aspect of the invention to provide a fixture for remanufacturing cutting inserts, and for manufacturing new cutting inserts with a ground edge, that increases throughput.

It is a further aspect of the invention to provide a fixture for remanufacturing cutting inserts, and for manufacturing new cutting inserts with a ground edge, that involves a relatively low up-front cost.

It is a further aspect of the invention to provide a fixture for remanufacturing cutting inserts, and for manufacturing new cutting inserts with a ground edge, that is operable by non-technical personnel.

It is a further aspect of the invention to provide a fixture for remanufacturing cutting inserts, and for manufacturing new cutting inserts with a ground edge, that reduces the overall time required for unclamping and indexing inserts.

It is a further aspect of the invention to provide a fixture for remanufacturing cutting inserts, and for manufacturing new cutting inserts with a ground edge, that is effective at clamping inserts on a high volume basis.

It is a further aspect of the invention to provide a fixture for remanufacturing cutting inserts, and for manufacturing new cutting inserts with a ground edge, that provides positive seating of an insert.

It is a further aspect of the invention to provide a fixture for remanufacturing cutting inserts, and for manufacturing new cutting inserts with a ground edge, that allows the insert to be ground to exacting tolerances.

It is a still further aspect of the invention to provide a fixture for remanufacturing cutting inserts, and for manufacturing new cutting inserts with a ground edge, that does not easily fill with debris.

These aspects of the invention are not meant to be exclusive and other features, aspects, and advantages of the present invention will be readily apparent to those of ordinary skill in the art when read in conjunction with the following description, appended claims and accompanying drawings.

BRIEF DESCRIPTION OF THE DRAWINGS

FIGS. 9A–9D are side views of four different embodiments of a cutting insert ground using the system of FIG. 7.

FIG. 10 is a top view of one embodiment of the system of the present invention in which multiple fixture apparati are arranged around a rotary grinder table such that the insert faces the outer circumference of the table and in which a grinding wheel is disposed in perpendicular relation to the grinder table.

FIGS. 17A–17C are isometric, side and top views of one embodiment of a concave helical cutting insert ground using the system of FIG. 16.

DETAILED DESCRIPTION OF THE INVENTION

Figure 1:
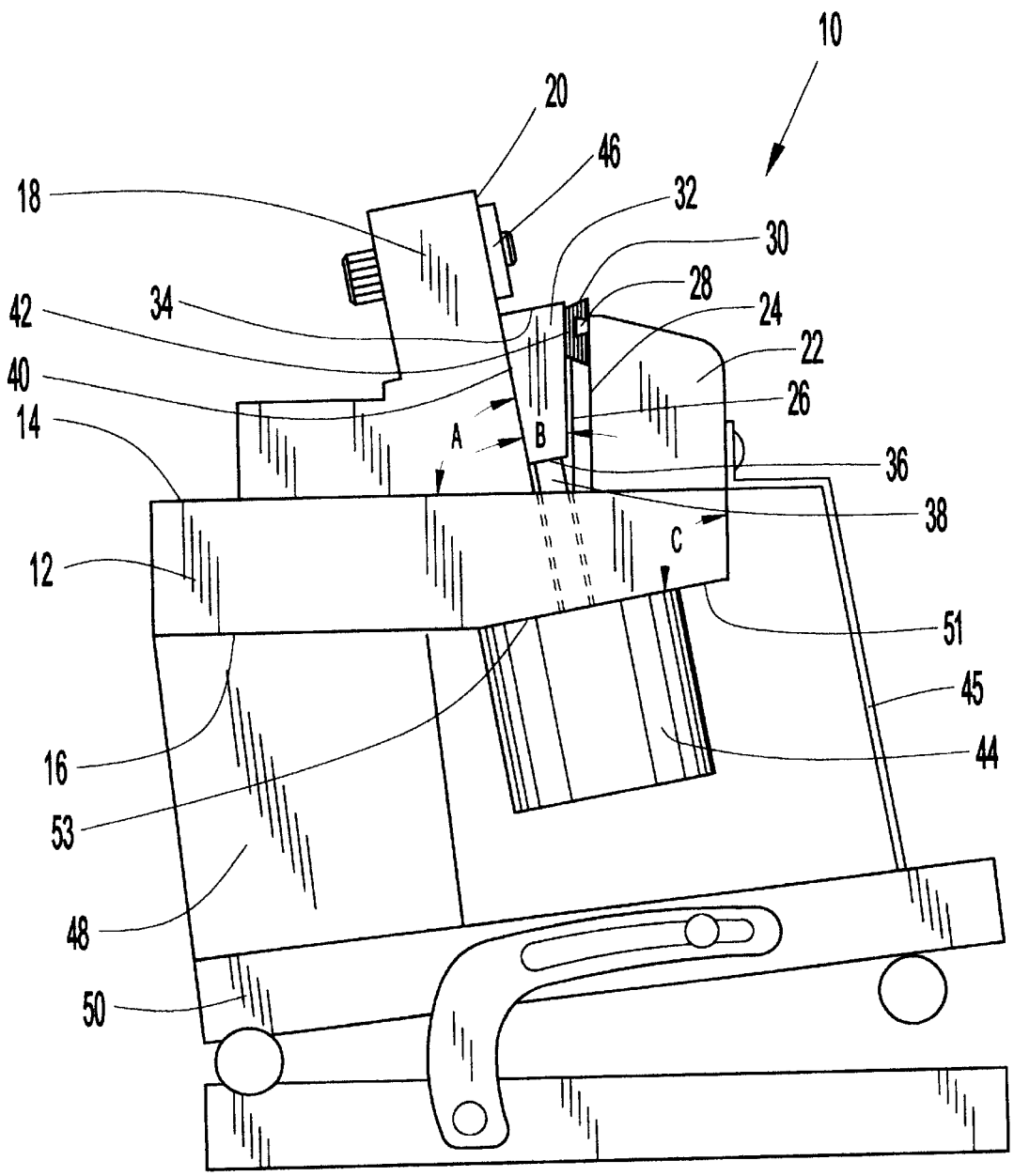
FIG. 1 is a side view of the preferred fixture apparatus of the present invention with its cover cut away.

Referring first to FIG. 1, a side view of the preferred fixture apparatus 10 is shown. The fixture apparatus 10 includes a base plate 12 having a top surface 14 and a bottom surface 16. A clamp block 18 extends from the base plate 12 and has a clamp surface 20 disposed at a first angle A from the top surface 14 of the base plate 12. A locator block 22 also extends from the base plate 12 and includes a locator surface 24 that is disposed opposite the clamp surface 20 of the clamp block 18. The preferred apparatus includes a locator blade 26 and a locator pin 28, which serve as an alignment means for aligning the cutting insert 30 relative to the locator surface 24 of the locator block 22.

A clamp wedge 32 is disposed between the clamp surface 20 of the clamp block 18 and the locator surface 24 of the locator block 22. The clamp wedge 32 includes a top 34, a bottom 36, a drive shaft 38 extending from the bottom and through the base plate 12. The clamp wedge 32 has a bearing surface 40 that is disposed against the clamp surface 20 of the clamp block 18, and in substantially parallel relation to the drive shaft 38, and a wedge surface 42 that is disposed at a second angle B relative to the bearing surface 40 of the clamp wedge 32. The second angle B of the wedge surface 42 is complimentary to the first angle A of the clamp surface 20 of the clamp block 18 such that the wedge surface 42 is disposed in substantially parallel relation to the locator surface 24 of the locator block 22. A pneumatic or hydraulic cylinder 44 is attached to the drive shaft 38 of the clamp wedge 32 and serves as a drive means for extending and retracting the clamp wedge 32. A stop assembly 46 extends from the clamp surface 20 of the clamp block 18 for limiting the upward travel of the clamp wedge 32. Finally, a cover assembly 45 is provided for enclosing the drive components, such as the drive shaft 38, and cylinder 44, to protect them from debris created during the remanufacturing process.

Figure 6:
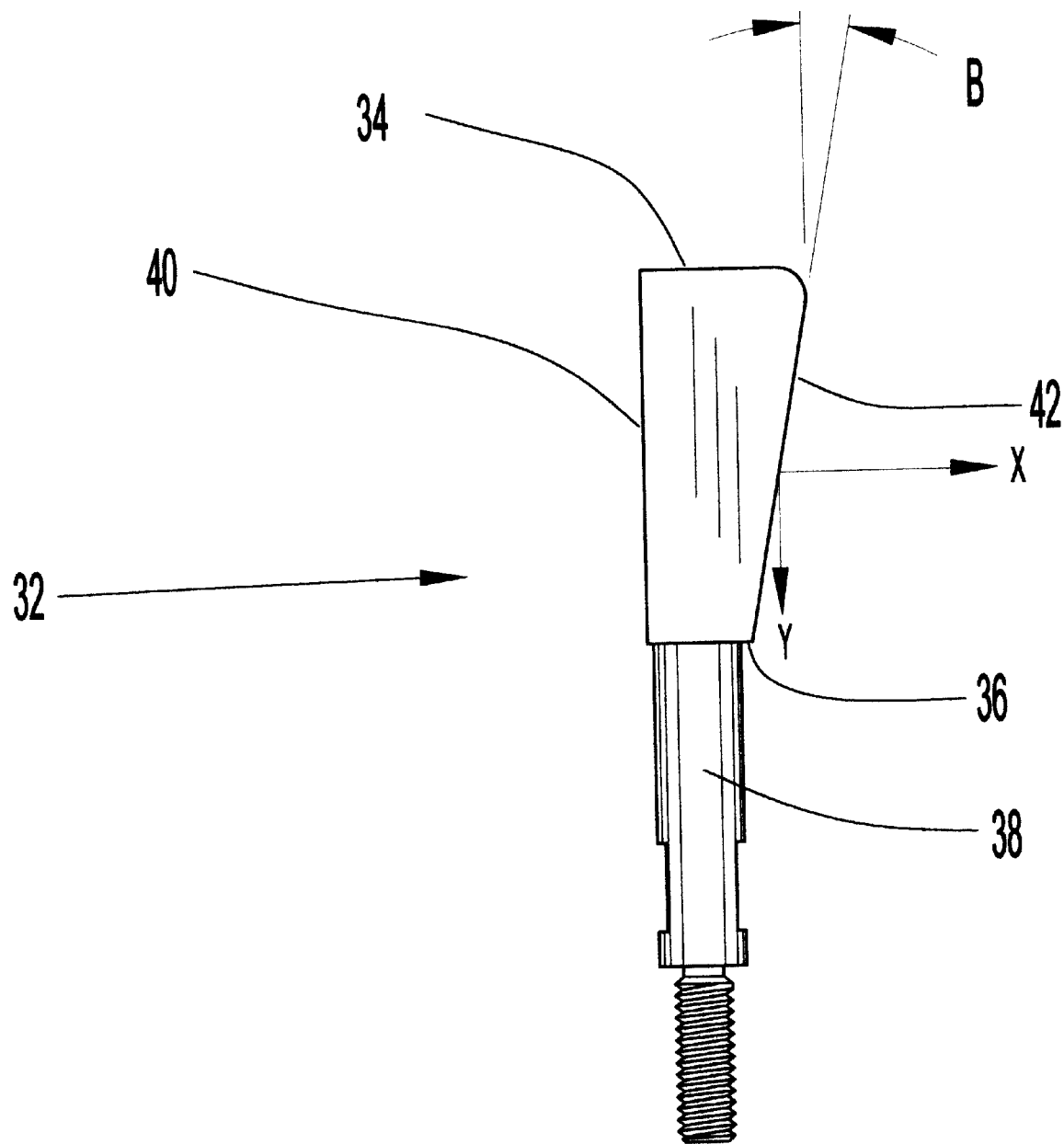
FIG. 6 is a side view of the preferred clamp block and drive shaft of the apparatus of the present invention.

In operation, the clamp wedge 32 is extended by the pneumatic or hydraulic cylinder 44 until it comes into contact with the stop assembly 46. The cutting insert 30 is then disposed between the wedge surface 42 of the clamp wedge 32 and the locator surface 24 of the locator block 22, and is aligned relative to the locator surface 24 via the locator blade 26 and locator pin 28. Once the cutting insert 30 has been properly aligned, the cylinder 44 retracts the clamp wedge 32. The retraction of the clamp wedge 32 causes the angled wedge surface 42 of the clamp wedge 32 to exert a downward force upon the cutting insert 30, which affirmatively locates it relative to the locator blade 26, and a clamping force, which secures the cutting insert 30 against the locator surface 24 of the locator block 22. This bi-directional force, represented as forces X and Y in the vector diagram shown in FIG. 6, provides the necessary clamping of the cutting insert 30 as well as the positive seating of that cutting insert 30 that is necessary to allow the cutting insert 30 to be ground to the exacting tolerances required to provide the desired rake geometry.

Referring again to FIG. 1, the bottom surface 16 of the base plate 12 has an angled front portion 51 to accommodate a pneumatic or hydraulic cylinder 44, or a suitable electro-mechanical drive means. This angled front portion 51 is preferably perpendicular to the top 53 of the pneumatic cylinder 44 and is disposed at a complimentary angle C relative to the clamp surface 20 of the clamp block 18 such that the drive shaft 38 is driven in substantially parallel relation to the clamp surface 20. However, in other embodiments, the bottom surface 16 of the base plate 12 may take other forms, provided the drive means, such as cylinder 44, drives the drive shaft 38 in parallel relation to the clamp surface 20.

It is preferred that the base plate 12 of the fixture apparatus 10 is attached to an angle adjustment means, such as a sine base, riser block or incline table. In the embodiment of FIG. 1, the angle adjustment means is a standard twelve-inch sine base 50. In such an embodiment, the sine base 50 is attached to the base plate 12 via a riser block 48, which provides the necessary space to allow the pneumatic cylinder 44 to fit between the base plate 12 and sine base 50. The preferred sine base 50 allows a rake angle of the insert to be varied between about minus fifteen degrees (−15°) and about twenty-five degrees (25°).

Figure 2:
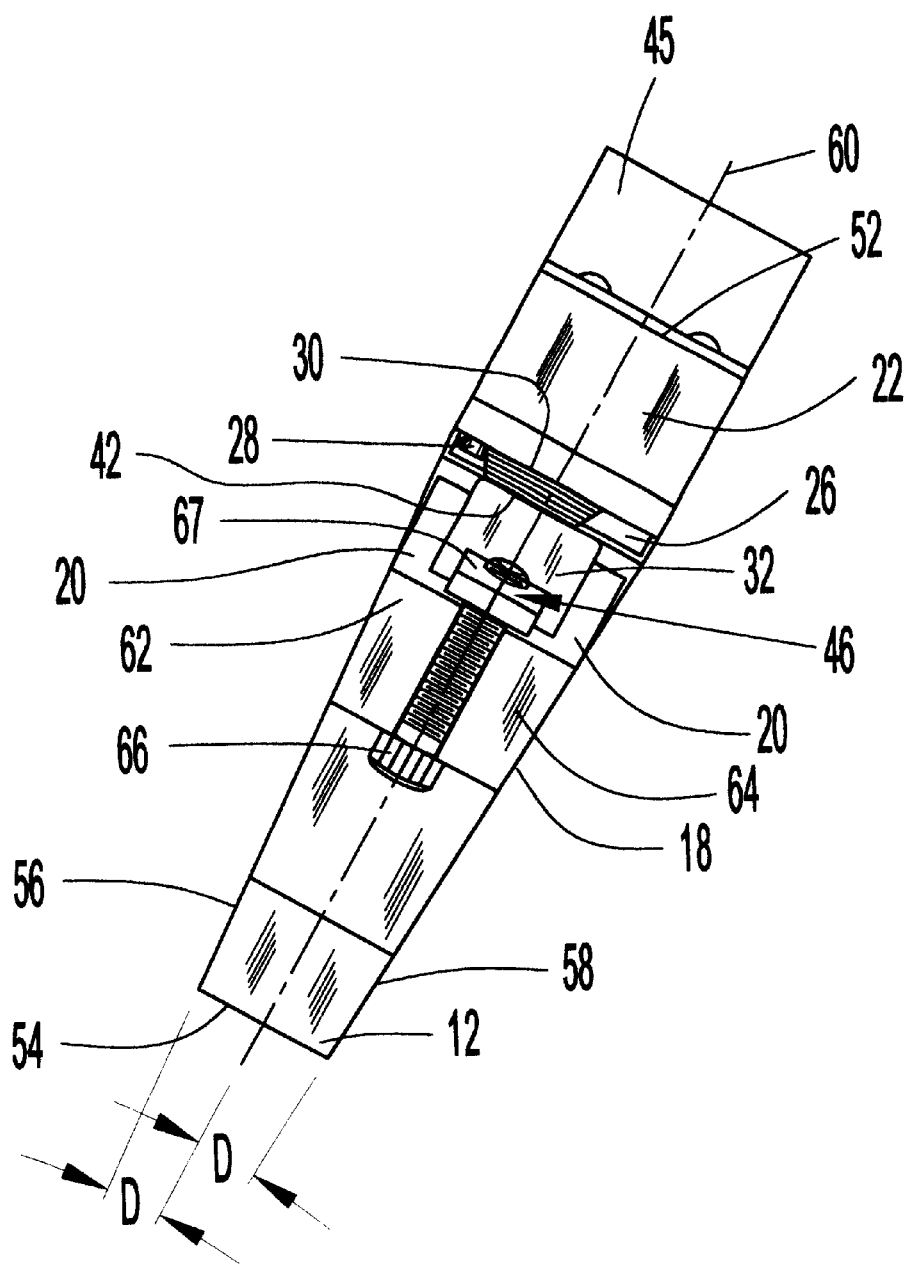
FIG. 2 is a top view of the preferred fixture apparatus of the present invention.

As shown in FIG. 2, the preferred base plate 12 is wider at its front surface 52 than its back surface 54 and includes a pair of side walls 56, 58 that each form an angle D, preferably eight degrees (8°), from a plane formed by the centerline 60 of the base plate 12. This arrangement is preferred as it allows multiple fixture apparati 10 to be mounted to a rotary table (not shown). In other embodiments, however, base plates 12 having substantially parallel sidewalls 56, 58 are provided in order to allow multiple apparati 10 to be mounted in a straight-line arrangement.

As shown in FIGS. 1 and 2, the preferred clamp block 18 includes a pair of clamp rails 62, 64 that include a pair of substantially planar clamping surfaces 20. In this preferred embodiment, the stop assembly 46 is a cap screw 66 and a lock nut 67 that are mounted in a notch formed in the clamp block 18 between the clamp rails 62, 64. As noted above, the stop assembly 46 is preferably adjustable such that the distance between the wedge surface 42 of the clamp wedge 32 and the cutting insert 30 is small enough to prevent it from inadvertently falling between the clamp wedge 32 and the locator blade 26. In the preferred embodiment, this distance is approximately 0.030 inches. In other embodiments, a fixed stop assembly 46 is provided at a point where most of such inadvertent falling of inserts 30 is prevented. In still other embodiments, the stop assembly 46 is eliminated completely and the operator of the fixture apparatus 10 is relied upon to ensure that inserts 30 are not inadvertently dropped.

In the preferred apparatus, the clamp block 18 and locator block 22 are removably attached to the base plate 12 in order to allow these blocks 18, 20, to be replaced in the event that they are damaged. However, in other embodiments, the clamp block 18 and locator block 22 may be formed integral to the base plate 12. Similarly, it is preferred that the locator blade 26 and a locator pin 28 be removably attached to the locator surface 24 of the locator block 22. This is preferred as it allows the locator blade 26 and locator pin 28 to be replaced in the event that either are damaged, and also allows the locator blade 26 and locator pin 28 to be replaced by an alignment means that is customized for a particular insert 30. However, in other embodiments, the locator blade 26 and locator pin 28 are replaced with other alignment means formed integral to the locator block 22.

Figure 3:
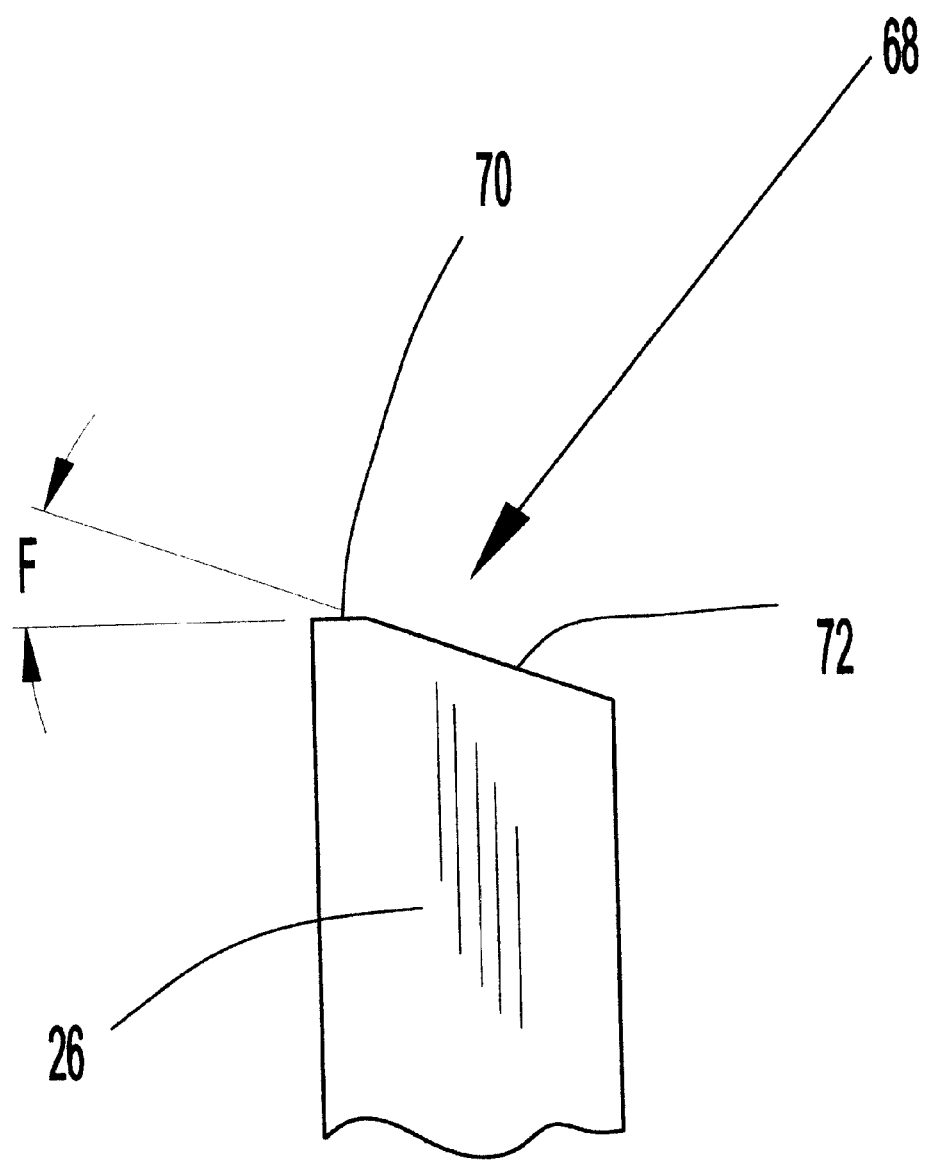
FIG. 3 is an exploded side view of the top portion of the preferred locator blade for locating inserts having parallel flanks.

As shown in FIG. 3, the preferred locator blade 26 has top surface 68 that is segmented into two sections 70, 72. The first section 70 is a substantially flat section that extends backward a short distance, preferably 0.020 inches, towards the locator block. The second section 72 is an angled section that slopes downward at an angle F from the first section 70 towards the locator block. In the preferred embodiment, the second section 72 extends at an angle F of approximately twenty degrees (20°) from the first section 70. This angle F is preferred, as it has been found to accommodate a wider variety of inserts than other angles. However, in other embodiments, locator blades 26 having different top surfaces 68, or other angular relationships, may also be utilized.

Figure 4:
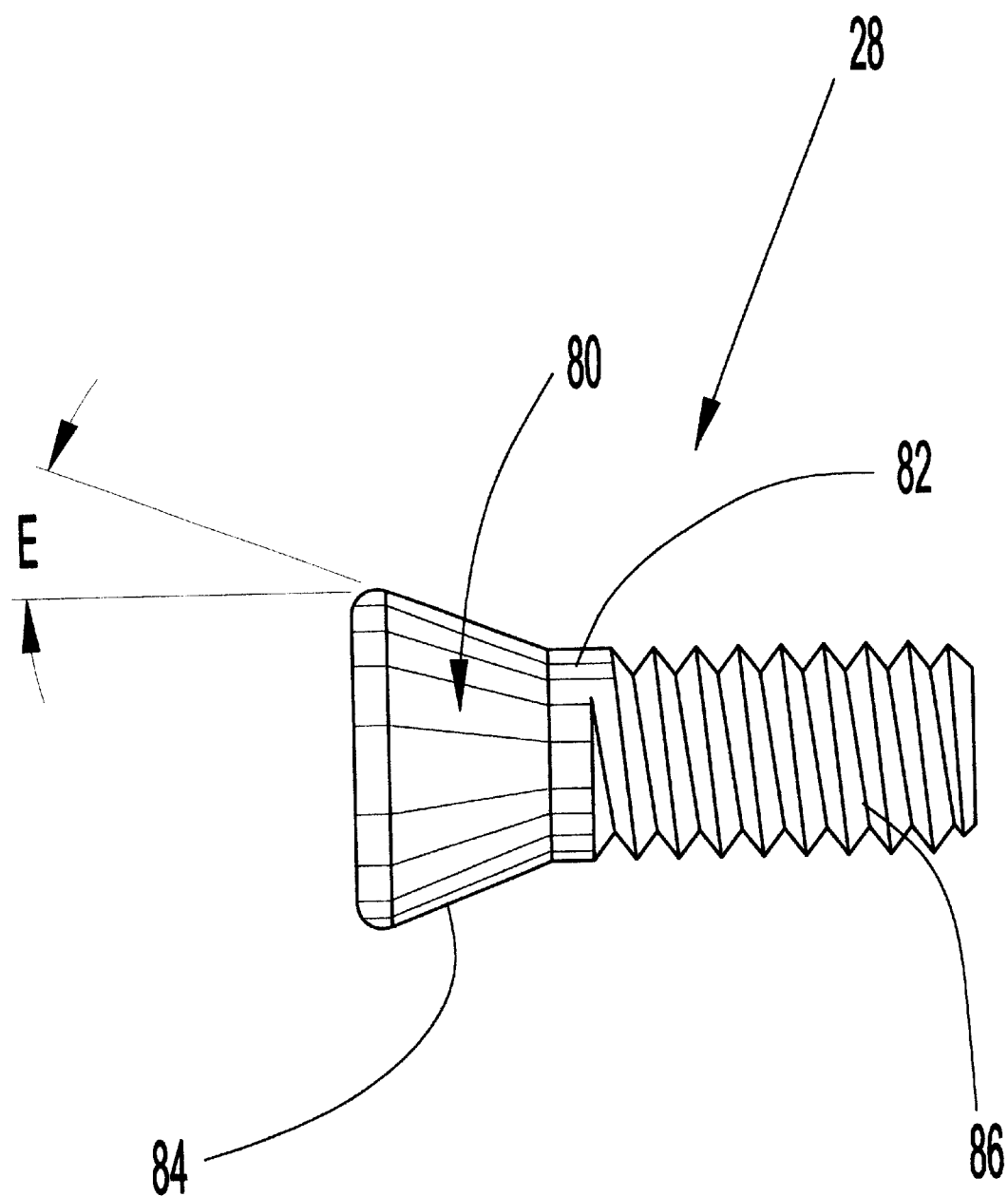
FIG. 4 is an exploded side view of the preferred locator pin of the apparatus of the present invention.

Referring now to FIG. 4, the preferred locator pin 28 is a round pin having a cap 80 that includes a flat portion 82 along its edge and an angled portion 84 disposed at a predetermined angle E from its threaded shaft 86. In the preferred apparatus, the angled portion 84 is disposed at a twenty degree (20°) angle to the centerline of the threaded shaft 86. However, in other embodiments, caps 80 having angled portions 84 disposed at other angles E may be utilized to achieve similar results. In still other embodiments, the locator pin 28 is replaced by a vertical locator blade, or other alignment means for aligning the insert in the horizontal direction.

Figure 5:
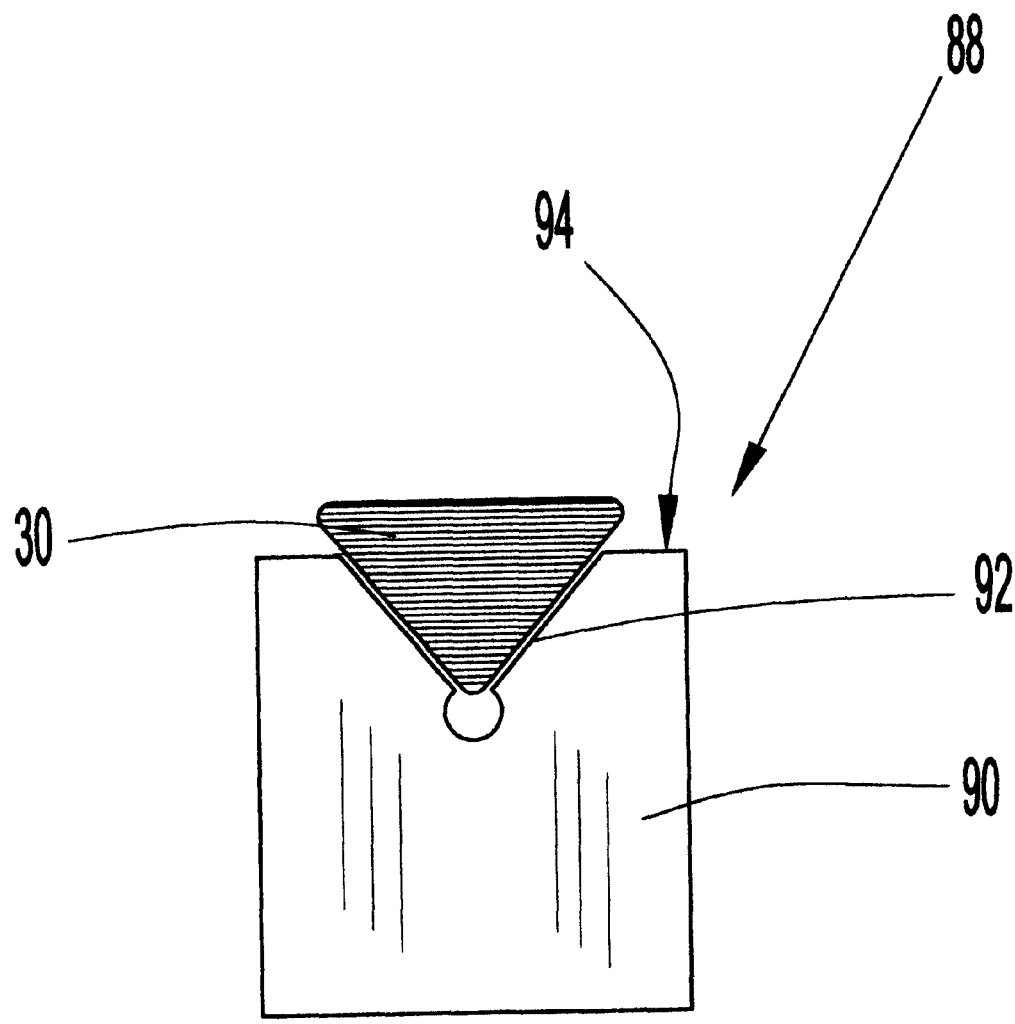
FIG. 5 is a front view of a locator blade utilized for locating cutting inserts having non-parallel flanks.

Referring now to FIG. 5, an alternative embodiment of the alignment means 88, for use with triangular inserts, or other inserts having non-parallel sides, is shown. In this embodiment, the alignment means 88 is a locator blade 90 having a "V" shaped notch 92, disposed at a sixty degree (60°) included angle, along its top edge 94. This "V" shaped notch 92 is dimensioned to accept a triangular cutting insert 30 to allow one of the edges of the insert 30 to be ground. Like the locator blade 26 of the preferred embodiment, the locator blade 90 is removably attached to the locator surface 24 of the locator block 22. However, because the "V" shaped notch 92 aligns the insert both vertically and horizontally, the locator pin 28 of the preferred embodiment may be eliminated in embodiments utilizing this alternative locator blade 90.

Although locator blades 26, 90 have been described herein, it is also recognized that alignment means 88 may be formed into the locator surface 24 of the locator block 22. Further, other alignment means 88, having different shapes for accepting workpieces of different geometric configurations, may be utilized to achieve similar results.

Referring now to FIG. 6, the preferred clamp wedge 32 is shown. As noted above, the preferred clamp wedge 32 includes a substantially vertical bearing surface 40 and a wedge surface 42 that is angled at an angle B of ten degrees (10°) form the bearing surface in order to correspond with the ten degree (10°) angle of the preferred clamping surface of the preferred clamp block (not shown). However, it is recognized that wedge surfaces 42 having different angles may be utilized, provided that the wedge surface 42 is disposed in substantially parallel relation to the locator surface 24 of the locator block 22 when the bearing surface 40 is disposed against the clamp surface 20 of the clamp block 18. The preferred clamp wedge 32 includes a threaded drive shaft 38 that is removably attached to the clamp wedge 32 at one end and to a drive means (not shown), at the other. However, in some embodiments, the drive shaft 38 is formed integral to the clamp wedge 32, while in other embodiments, the drive shaft 38 is formed integral to the drive means.

Figure 7:
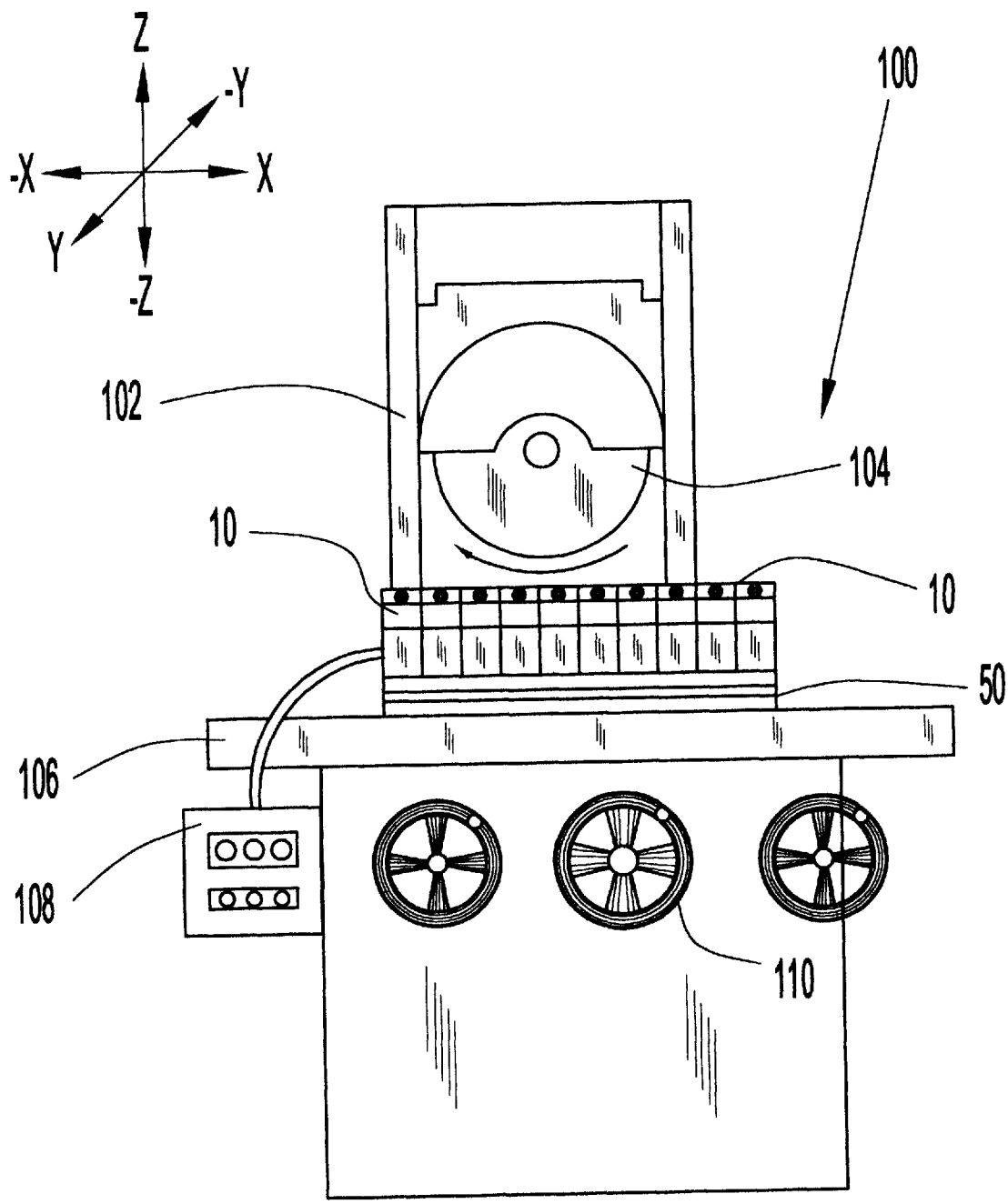
FIG. 7 is a front view of one embodiment of the system of the present invention in which multiple fixture apparati are arranged in a straight line across a grinder table.

Referring now to FIG. 7, the preferred grinding system 100 of the present invention, utilizing a plurality of the fixture apparati 10, is shown. The preferred grinding system 100 includes a standard surface grinder 102, having a grinding wheel 104, which is movable along one axis, and a grinder table 106, which is movable along two axes. In the preferred embodiment, the grinder table 106 is equipped with an automatic feed mechanism, which causes the table to traverse a fixed distance at a fixed speed. However, in other embodiment, the grinder table 106 is caused to traverse by the manual movement of the traverse control 110.

A sine base 50 is securely mounted to the grinder table 106 via a magnetic chuck, T-slot, or other art recognized mechanical fastener, and is set to the proper angle to produce the desired rake angle on the insert to be ground. A plurality of fixture apparati 10 are mounted next to one another and are secured to the sine base 50 via mechanical fasteners, such as screws. A pneumatic or hydraulic controller 108 is placed in fluid communication with each of the cylinders within the fixture apparati 10 and is programmed to simultaneous extend and retract the drive shaft of each apparatus 10. In the preferred embodiment, the drive shafts are extended or retracted when an operator pushes a valve upon the controller 108. However, in other embodiments the controller 108 is programmed to extend or retract based upon the travel of the grinder table 106.

In operation, a user will cause the controller 108 to extend each drive shaft, will load inserts into each fixture apparatus, and will cause the controller 108 to retract each drive shaft. The user will then align the inserts in the proper position relative to the grinding wheel 104 and traverse the grinder table 106 such that the exposed edge of each insert is ground. The user will then stop the traverse of the grinder table 106, will again cause the controller 108 to extend each drive shaft, will index each insert, and will again cause the controller 108 to retract each shaft. This process will be repeated until each edge of each insert is ground.

Figure 8A:
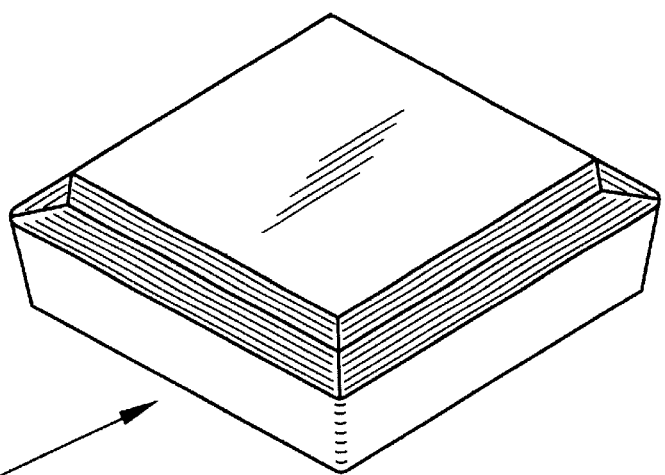
FIGS. 8A–8C are isometric, side and top views of one embodiment of a cutting insert ground using the system of FIG. 7.
Figure 8B:
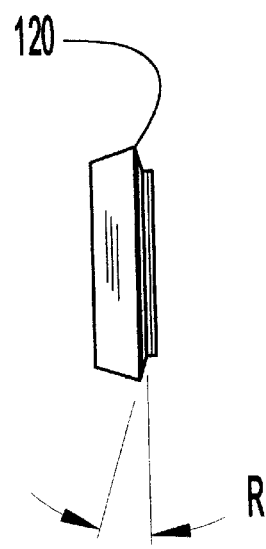
Figure 8C:
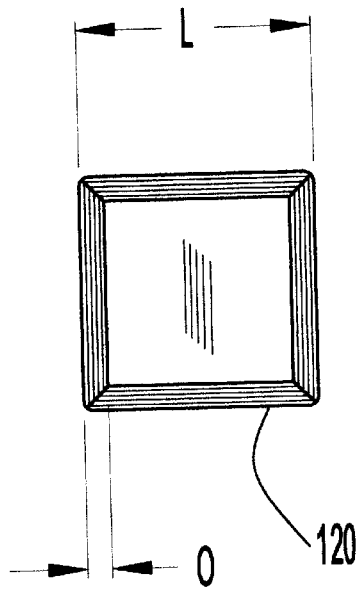

Referring now to FIGS. 8A–8C, isometric, side and top views of one embodiment of a cutting insert 30 ground using the system of FIG. 7 are shown. In this embodiment, a straight T-land shape 120 is ground upon the insert 30. This straight shape 120 is ground across the entire length L of each edge and is defined by an overall width O and a rake angle R.

As shown in FIGS. 9A–D, four basic variations to the T-land shape 120 are shown. The embodiment of FIG. 9A is referred to as "a zero degree T-land". In this embodiment, the rake angle R is zero and the overall length O is made up of run-out portion 122 and substantially flat portion 124, which is disposed a predetermined distance DP below the top surface 130 of the insert 30.

The embodiment of FIG. 9B is referred to as a "negative T-land with run out". In this embodiment, the rake angle R is negative, the overall length O is made up of run-out portion 122 and substantially flat portion 124 that terminates at an edge 128 disposed a predetermined distance DP below the top surface 130 of the insert 30.

The embodiment of FIG. 9C is referred to as a "negative T-land without run out". In this embodiment, the rake angle R is again negative, and the overall length O is made entirely of substantially flat portion 124 that slopes downward from the top surface 130 of the insert 30 terminates at an edge 128 disposed a predetermined distance DP below the top surface 130 of the insert 30.

Finally, the embodiment of FIG. 9D is referred to as a "positive T-land". In this embodiment, the rake angle R is positive and the overall length O is made up of run-out portion 122 and substantially flat portion 124.

Figure 12:
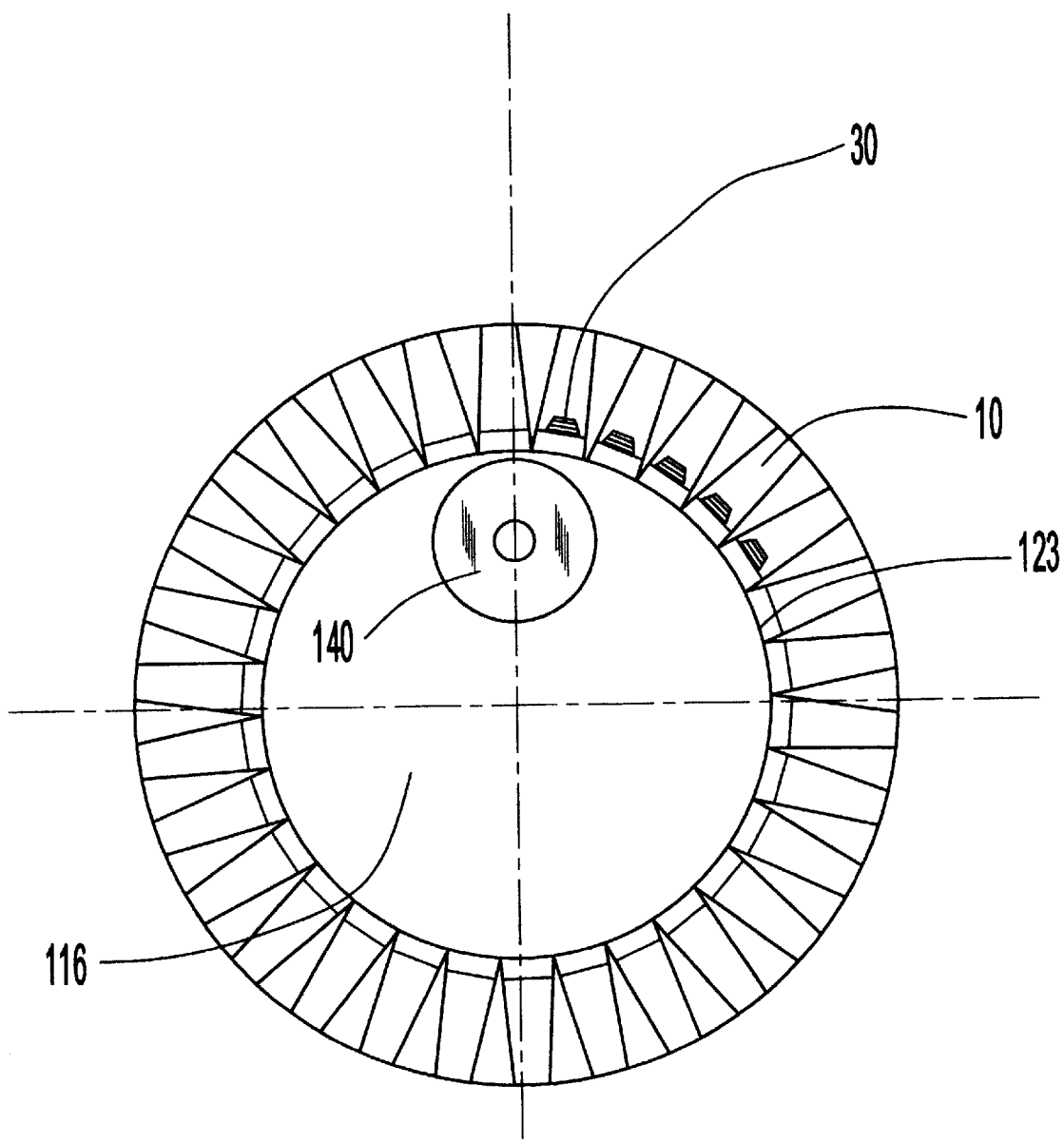
FIG. 12 is a top view of one embodiment of the system of the present invention in which multiple fixture apparati are arranged around a rotary grinder table such that the insert faces the inner circumference of the table and in which a grinding wheel is disposed in perpendicular relation to the grinder table.

Referring now to FIGS. 10 and 12, two embodiments of the system 100 of the present invention is shown. In each embodiment, multiple fixture apparati 10 are mounted in a substantially circular arrangement around a rotary grinder table 116. By mounting the apparati 10 in this arrangement, inserts may be indexed on a continuous basis, which eliminates down time in production, and allows both radial and helical forms to be ground upon the inserts 30.

In the embodiment of FIG. 10, a grinding wheel 104 is disposed in perpendicular relation to the rotary grinder table 116. In this arrangement, the fixture apparati 10 are arranged such that the top surface of each insert faces the outer circumference 121 of the rotary grinder table 116. The grinding wheel 104 is then disposed in a substantially fixed position relative to the insert 30 such that the rotation of the rotary grinder table 116 causes a convex radial T-land shape 130, such as those shown in FIGS. 11A–11C, to be ground upon the insert 30.

Figure 11A:
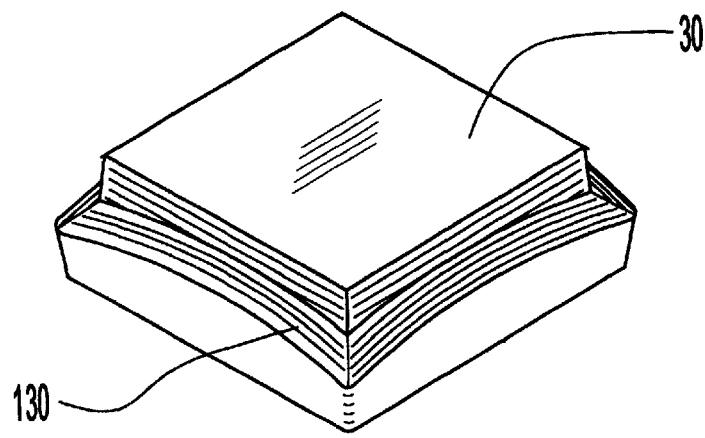
FIGS. 11A–11C are isometric, side and top views of one embodiment of a convex symmetrical cutting insert ground using the system of FIG. 10.
Figure 11B:
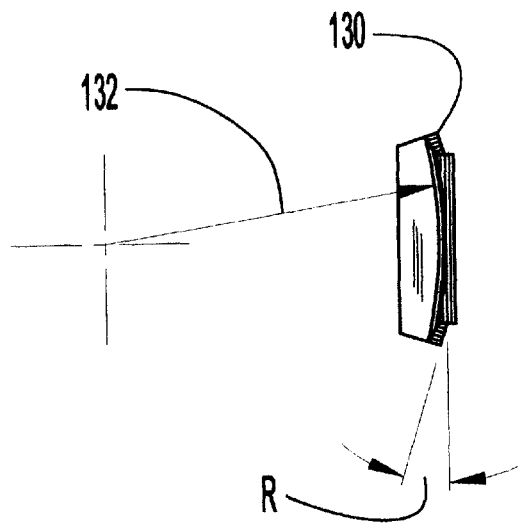
Figure 11C:
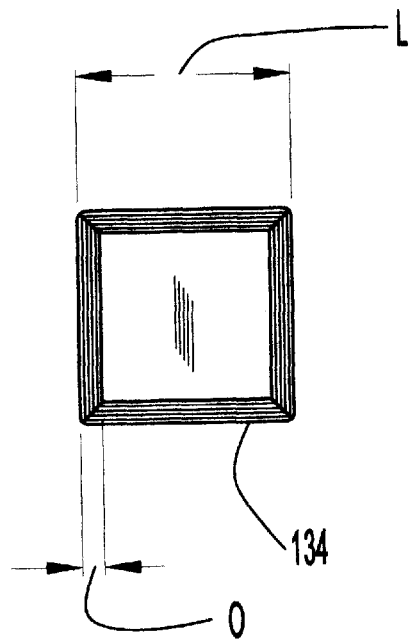

An insert 30 ground using the system of FIG. 10 is shown in FIGS. 11A–11C. This insert 30 is referred to as a "convex symmetrical insert" and includes a convex radial T-land shape 130 ground across the entire length L of each edge and is defined by an overall length O, a rake angle R, and a convex symmetrical radius 132. As was the case with the straight T-land shape 120 of FIGS. 9A–9D, the radial T-land may take the form of "zero degree T-land", a "negative T-land with run out", a "negative T-land without run out", or a positive "T-land". In these embodiments, the substantially flat portion 124 of FIGS. 9A–9D is replaced with a symmetrical convex radial surface 134.

In the embodiment of FIG. 12, a grinding wheel 140 is disposed in parallel relation to the rotary grinder table 116. In this arrangement, the fixture apparati 10 are arranged such that the top surface of each insert faces the inner circumference 123 of the rotary grinder table 116. The grinding wheel 140 is then disposed in a substantially fixed position relative to the insert 30 such that the rotation of the rotary grinder table 116 causes a concave radial T-land to be ground upon the insert 30.

Figure 13A:
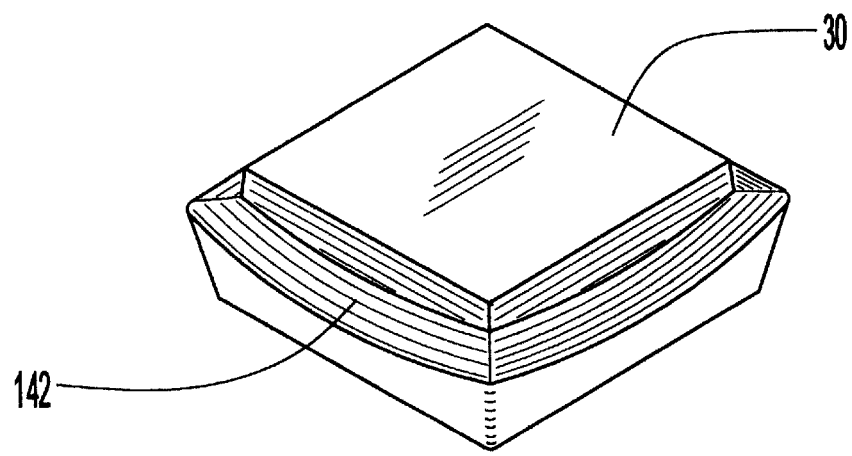
FIGS. 13A–13C are isometric, side and top views of one embodiment of a concave symmetrical cutting insert ground using the system of FIG. 12.
Figure 13B:
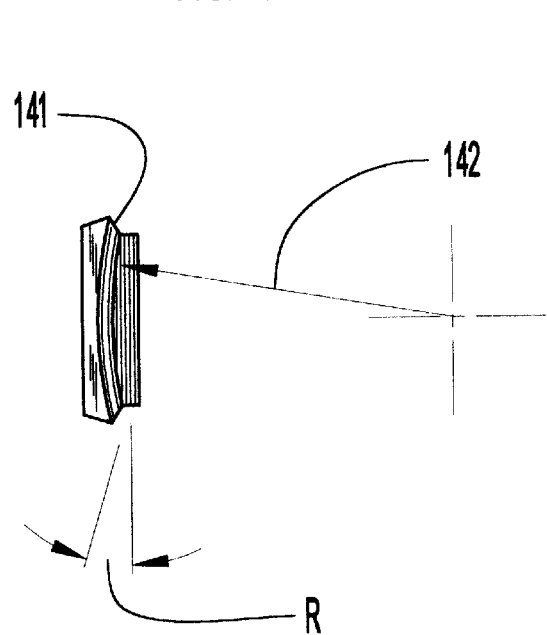
Figure 13C:
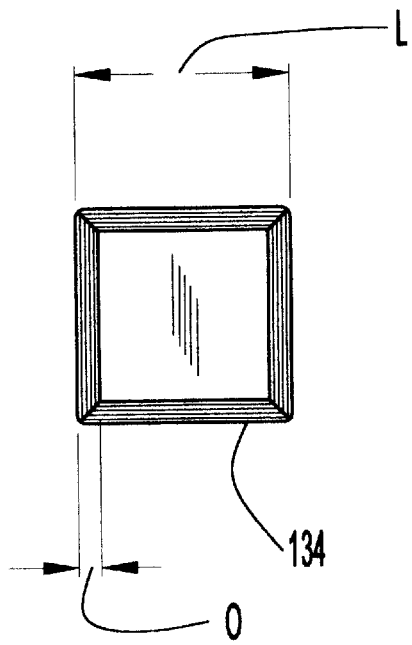

An insert 30 ground using this embodiment of the system is shown in FIGS. 13A–13C. This insert 30 is referred to as a "concave symmetrical insert" and includes a concave radial T-land shape 141 ground across the entire length L of each edge and is defined by an overall length O, a rake angle R, and a concave symmetrical radius 142. As was the case with the straight T-land shape 120 of FIGS. 9A–9D and the convex T-land shape 130 of FIGS. 11A–11C, the radial T-land shape 141 may take the form of "zero degree T-land", a "negative T-land with run out", a "negative T-land without run out", or a positive "T-land". In these embodiments, the substantially flat portion 124 of FIGS. 9A–9D is replaced with a symmetrical concave radial surface 134.

Figure 14A:
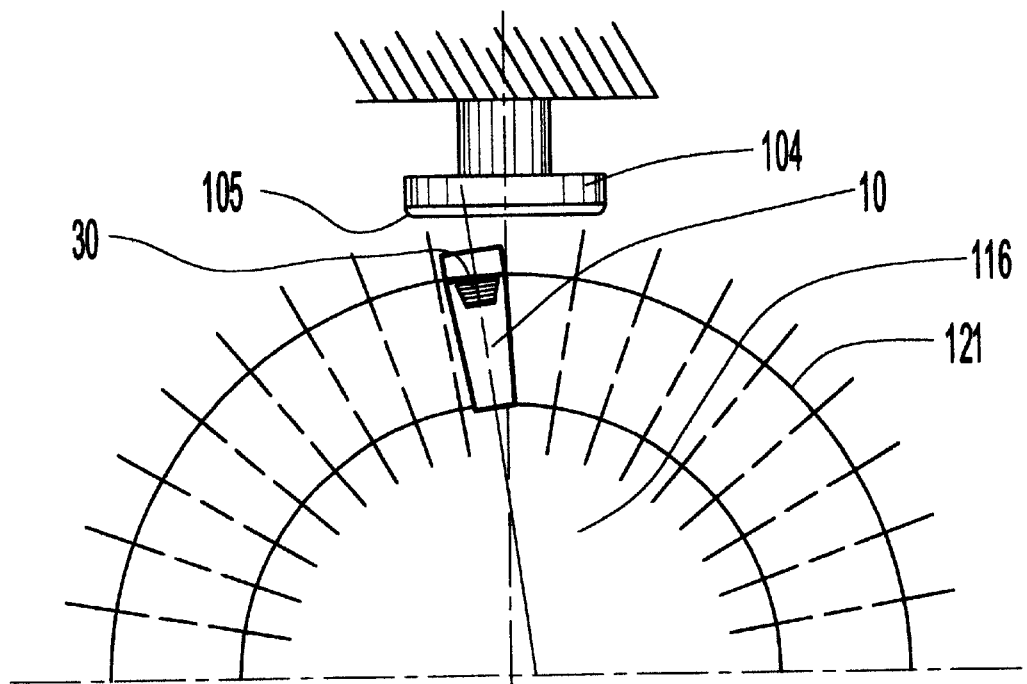
FIGS. 14A and 14B are exploded views of one embodiment of the system of FIG. 10 in which multiple fixture apparati are at an offset angle relative to the grinding wheel in order to produce a convex helical T-land upon the insert.
Figure 14B:
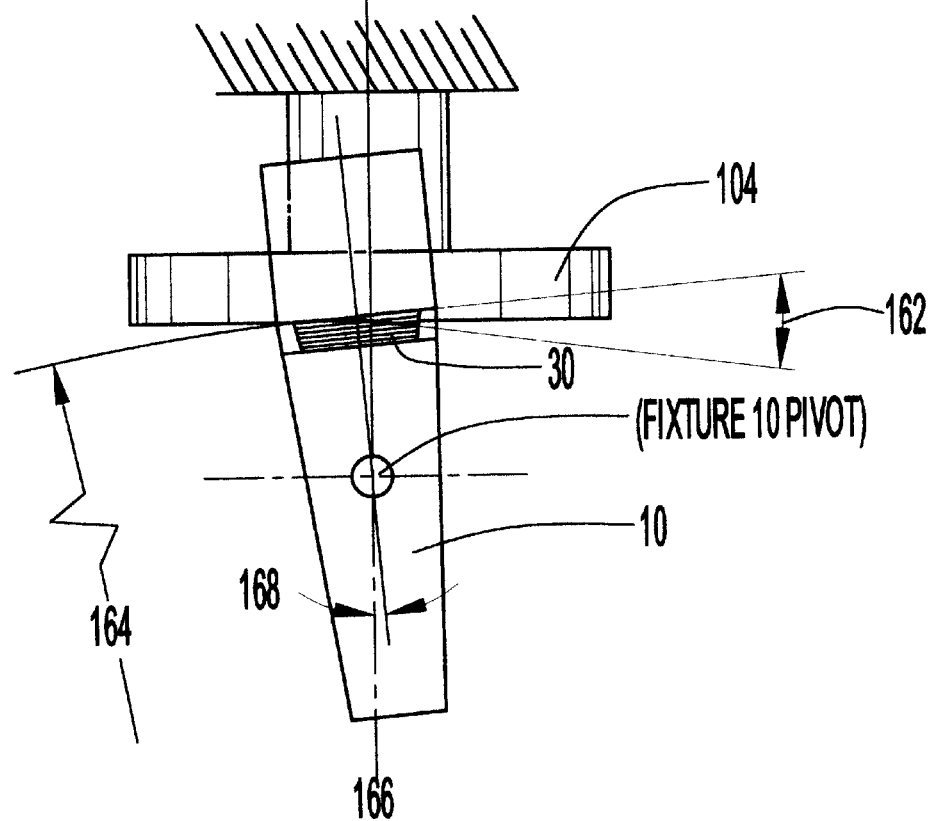

In addition to straight and radial T-lands, the system 100 of the present invention may also be adapted to grind helical T-lands upon an insert 30. FIGS. 14A and 14B are exploded views of one embodiment of the system of FIG. 10 that is adapted for the purpose of grinding convex helical T-lands upon inserts. In this embodiment, multiple fixture apparati 10 are disposed such that the inserts face the outer circumference 121 of the rotary table 116, in a manner similar to that of embodiment of FIG. 10. However, in this embodiment, each fixture apparatus 10 is disposed at an offset angle 168 relative to the grinding wheel 104. However, it is recognized other standard vertical spindle machines, such as Blanchard style grinders, may also be utilized in the system 100 of the present invention in order to create both convex and concave T-lands.

In order to produce a convex helical T-land upon the insert 30, four basic factors are considered. The final rake shape is established by adjusting each factor to achieve specific cutting features.

The first factor is the rotational angle 162, which is dependent upon the radius 164 from the centerline 166 and the offset angle 168 of the rotary table 116 relative to the grinding wheel 104. This radius 164 is usually between about nine inches and about twelve inches and is typically fixed at the radius of the rotary table 116 or by changing the offset angle 168. Accordingly, it is typically only changed by utilizing a different rotary table 116. However, in other embodiments, a slide assembly (not shown) may be utilized to move the rotary table 116 perpendicularly to and from the grinding wheel 104 in order to alter the radius 164.

The second factor is the handedness and degree of the helical angle, i.e. right-handed or left-handed. The helical angle is typically between five degrees (5°) and fifteen degrees (15°) and is adjusted by adjusting the offset angle 168 of the fixture apparatus 10 relative to the radius 164 from the centerline 166 of the rotary table 116 to the grinding wheel 104. This adjustment is typically made by adjusting the offset angle 168 clockwise or counterclockwise. A low helical angle is usually used when cutting hard material, such as tool steel, while a high helical angle is usually used when cutting soft materials, such as aluminum.

The third factor is the base angle, which establishes the top rake. In the preferred embodiment, this angle is set using a sine base, which will typically vary the top rake angle between about +10° and −10°. A high top rake angle is typically used on soft materials, such as aluminum, while a low top rake angle is typically used on hard materials, such as tool steel.

The fourth factor is the edge radius 105 of the grinding wheel, which combines with the helical angle to grind a helical form on the top rake of the insert 30.

Figure 15A:
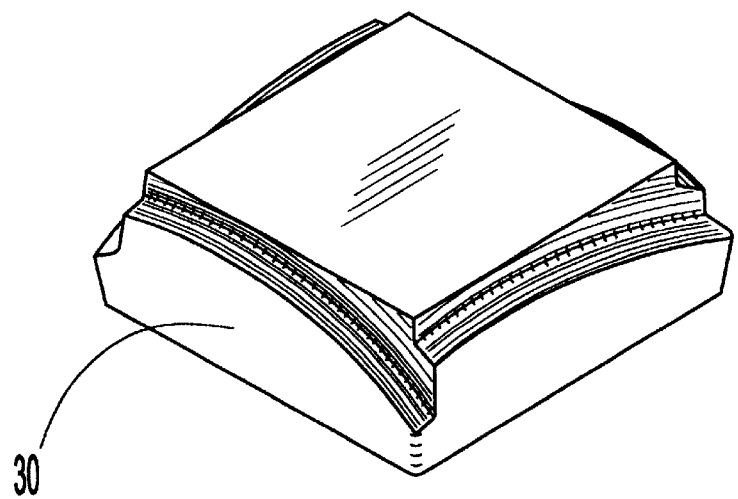
FIGS. 15A–15C are isometric, side and top views of one embodiment of a convex helical cutting insert ground using the system of FIG. 14.
Figure 15B:
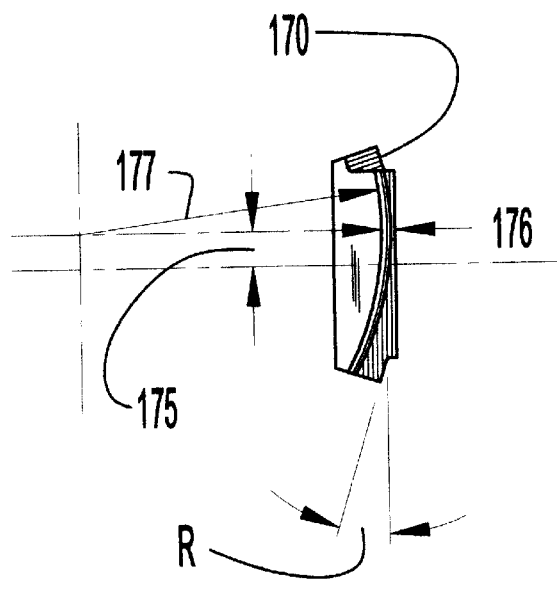
Figure 15C:
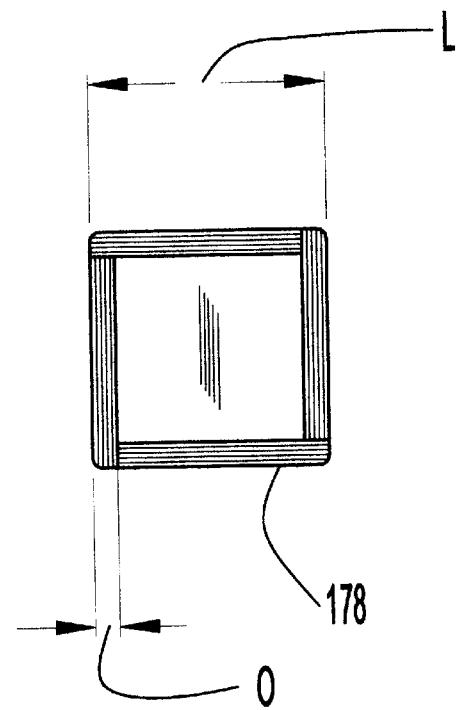

FIGS. 15A–15C are isometric, side and top views of one embodiment of a convex helical cutting insert 30 ground using the system of FIGS. 14A & 14B and oriented to make a left-handed cut. However, as will be obvious to those of ordinary skill in the art, the same principles will apply to inserts 30 oriented to make right-handed cuts. FIG. 15A is an isometric view of the helical rake shape ground on a top surface of the insert 30. While FIG. 15A depicts an insert remanufactured with a negative helical rake shape, a positive helical rake shape can also be used and the same principles apply thereto. FIG. 15B is a side view showing the rake angle R of the top rake, and the helical radius 174, which is tangent to the minimum depth 176. The minimum depth 176 is directly related to the offset 175, which is established by setting the offset angle 177 of the fixture apparatus 10 of FIGS. 14A and 14B. As was the case with the straight T-land shape 120 of FIGS. 9A–9D, the convex helical T-land shape 170 may take the form of "zero degree T-land", a "negative T-land with run out", a "negative T-land without run out", or a positive "T-land". In these embodiments, the substantially flat portion 124 of FIGS. 9A–9D is replaced with a convex helical surface 178, shown in FIG. 15C.

Figure 16A:
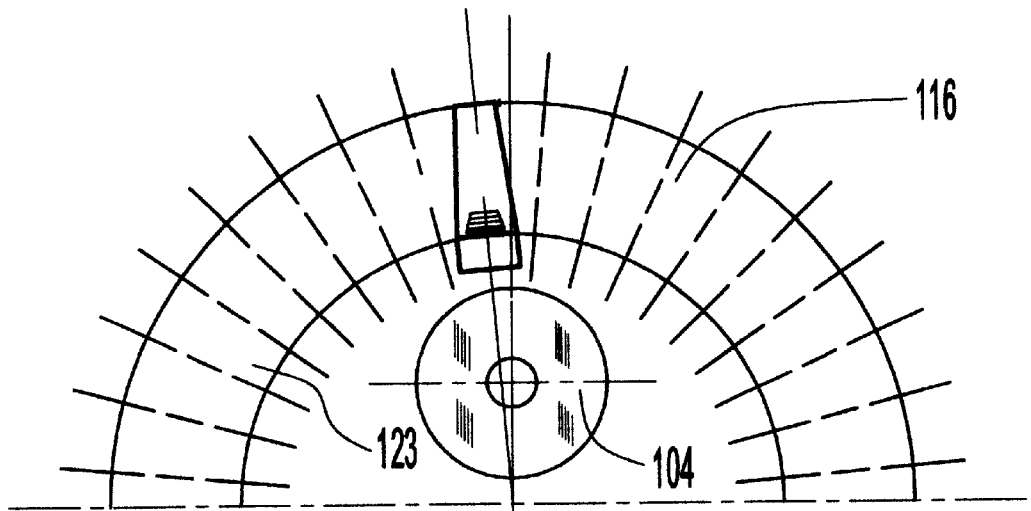
FIGS. 16A and 16B are exploded view of one embodiment of the system of FIG. 10 in which multiple fixture apparati are at an offset angle relative to the grinding wheel in order to produce a convex helical T-land upon the insert.
Figure 16B:
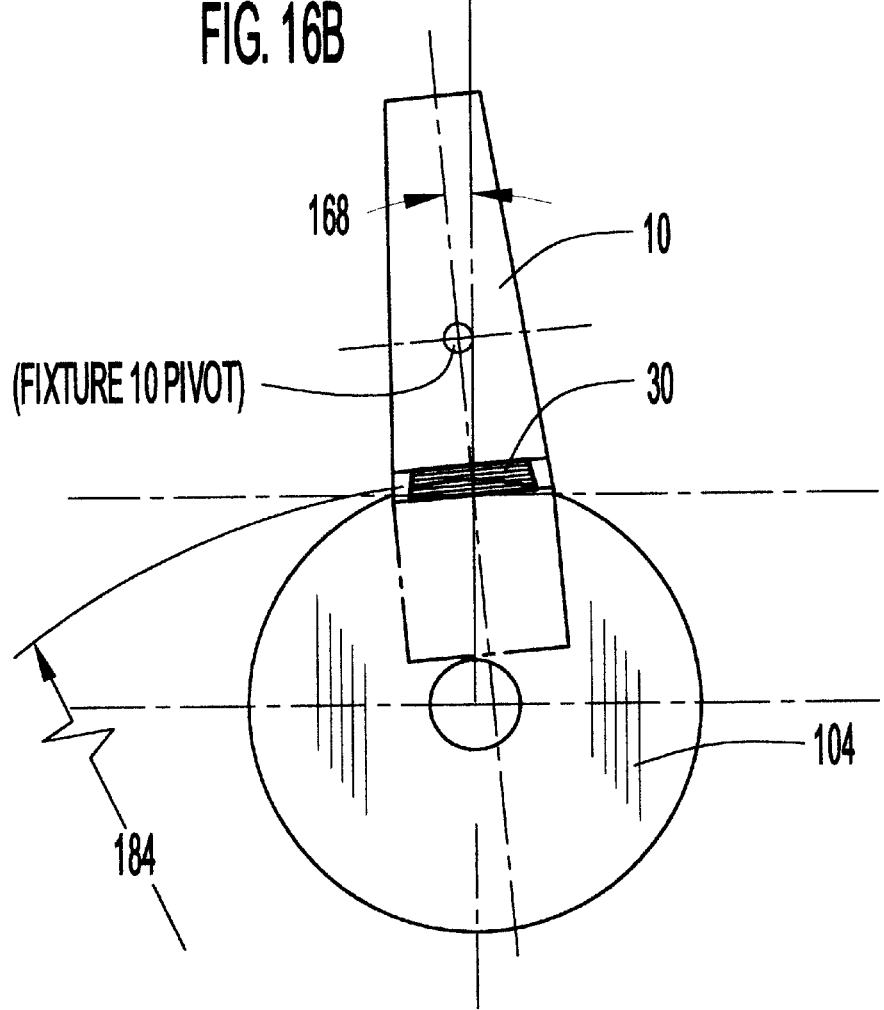

FIGS. 16A and 16B are exploded views of one embodiment of the system of FIG. 12 that is adapted for the purpose of grinding concave helical T-lands upon inserts 30. In this embodiment, multiple fixture apparati 10 are disposed such that each insert 30 faces the inner circumference 123, and at a radius 184 from the center, of the rotary table 116, in a manner similar to that of embodiment of FIG. 12. However, in this embodiment, each fixture apparatus 10 is disposed at an offset angle 168 relative to the grinding wheel 104.

FIGS. 17A–17C are isometric, side and top views of one embodiment of a concave helical cutting insert ground using the system of FIGS. 16A & 16B. FIG. 17A is an isometric view of the helical rake shape 180 ground on a top surface of the insert 30. While FIG. 17A depicts an insert ground with a negative helical rake shape, a positive helical rake shape can also be used and the same principles apply thereto. FIG. 17B is a side view showing the rake angle R of the top rake, and the helical radius 184, which is tangent to the minimum depth 186. As was the case with the straight T-land shape 120 of FIGS. 9A–9D, the concave helical T-land shape 180 may take the form of "zero degree T-land", a "negative T-land with run out", a "negative T-land without run out", or a positive "T-land". In these embodiments, the substantially flat portion 124 of FIGS. 9A–9D is replaced with a convex helical surface 188 through length L, as shown in FIG. 17C.

Although the present invention has been described in considerable detail with reference to certain preferred versions thereof, other versions would be readily apparent to those of ordinary skill in the art. For example, although the apparatus of the present invention has been described in connection with cutting inserts, it is understood that the apparatus is readily adapted to secure other types of workpieces including workpieces to be worked with round tools, such as drills, taps, mills, or the like, or by other machine tools, such as wire EDM machines.

Further, although the system of the present invention has been described as including a grinder, it is recognized that the other machine tools may be substituted to achieve similar results. As noted above, the system may be adapted to utilize CNC milling machines, both single and multi-axis, drill presses, EDM machines, or other machine tools requiring the clamping advantages of the present invention.

Finally, it is also readily recognized that the apparatus and system of the present invention may be combined with robotic, or other automatic, loading and unloading systems, and/or automated inspection systems in order to automate the present process. Therefore, the spirit and scope of the appended claims should not be limited to the description of the preferred versions contained herein.

What is claimed is:

1. A fixture apparatus for securing at least one workpiece, said apparatus comprising:
    a base plate having a top surface, a bottom surface, a front surface, a back surface, a first side wall, and a second side wall;
    a clamp block extending from said base plate, said clamp block comprising a clamp surface disposed at a first angle from said top surface of said base plate;
    a locator block extending from said base plate, said locator block comprising a locator surface disposed opposite said clamp surface of said clamp block;
    alignment means for aligning the workpiece relative to the locator surface of said locator surface of said locator block;
    a clamp wedge disposed between said clamp surface of said clamp block and said locator surface of said locator block, said clamp wedge comprising a top, a bottom, a drive shaft extending from said bottom and through said base plate, a bearing surface disposed against said clamp surface of said clamp block and in substantially parallel relation to said drive shaft, and a wedge surface disposed at a second angle relative to said bearing surface, said second angle being complimentary to said first angle of said clamp surface of said clamp block such that said wedge surface is disposed in substantially parallel relation to said locator surface of said locator block; and
    drive means for extending and retracting said clamp wedge;
    wherein the wedge is extended by said drive means, said workpiece is disposed against said locator surface of said locator block and aligned relative to said locator surface by said alignment means, and said wedge is retracted such that said wedge surface of said clamp wedge securely holds the workpiece in a predetermined location against said locator surface.

2. The fixture apparatus as claimed in claim 1 wherein said drive means is a cylinder and wherein said bottom surface of said base plate further comprises an angled front portion to which said cylinder is mounted.

3. The fixture apparatus as claimed in claim 1 wherein said first side wall and said second side wall are angled inward such that said front surface of said base plate is wider than said back surface.

4. The fixture apparatus as claimed in claim 3 wherein said first side wall and said second side wall are each angled inward at a substantially eight degree angle to a centerline of said base plate.

5. The fixture apparatus as claimed in claim 1 wherein said clamp surface of said clamp block is disposed at an angle of between about five degrees and about fifteen degrees from said top surface of said base plate.

6. The fixture apparatus as claimed in claim 5 wherein said clamp surface of said clamp block is disposed at an angle of substantially ten degrees from said top surface of said base plate.

7. The fixture apparatus as claimed in claim 1 wherein said clamp block further comprises a stop assembly for stopping an upward travel of said clamp wedge.

8. The fixture apparatus as claimed in claim 7 wherein said clamp block further comprises a clamp rail having a notch disposed therethrough and wherein said stop assembly is a screw and lock nut mounted within said notch.

9. The fixture apparatus as claimed in claim 1 wherein said alignment means comprises a locator blade and a locator pin attached to said locator surface of said locator block.

10. The fixture apparatus as claimed in claim 9 wherein said locator blade comprises a top surface having a substantially flat first section and an angled second section.

11. The fixture apparatus as claimed in claim 10 wherein said second section of said top surface is angled at a substantially twenty degree angle from said first section of said top surface.

12. The fixture apparatus as claimed in claim 9 wherein said locator pin is a substantially cylindrical pin comprising a cap and a threaded shaft, said cap comprising a flat portion along an outside edge and an angled portion disposed at an angle from said threaded shaft.

13. The fixture apparatus as claimed in claim 12 wherein said angled portion of said cap of said locator pin is disposed at a substantially twenty degree angle from said threaded shaft.

14. The fixture apparatus as claimed in claim 1 wherein said drive shaft is removably attached to said wedge portion of said clamp wedge.

15. The fixture apparatus as claimed in claim 1 wherein said drive means comprises a pneumatic cylinder.

16. The fixture apparatus as claimed in claim 1 further comprising a means for adjusting an angle of said base plate relative to a grinder table.

17. The fixture apparatus as claimed in claim 16 wherein said means for adjusting an angle comprises a sine base.

18. The fixture apparatus as claimed in claim 1 further comprising a cover assembly.

19. A system for grinding cutting inserts, said system comprising:
- a fixture apparatus comprising;
  - a base plate having a top surface, a bottom surface, a front surface, a back surface, a first side wall, and a second side wall;
  - a clamp block extending from said base plate, said clamp block comprising a clamp surface disposed at a first angle from said top surface of said base plate
  - a locator block extending from said base plate, said locator block comprising a locator surface disposed opposite said clamp surface of said clamp block;
  - alignment means for aligning the cutting insert relative to the locator surface of said locator surface of said locator block;
  - a clamp wedge disposed between said clamp surface of said clamp block and said locator surface of said locator block, said clamp wedge comprising a top, a bottom, a drive shaft extending from said bottom and through said base plate, a bearing surface disposed against said clamp surface of said clamp block and in substantially parallel relation to said drive shaft, and a wedge surface disposed at a second angle relative to said bearing surface, said second angle being complimentary to said first angle of said clamp surface of said clamp block such that said wedge surface is disposed in substantially parallel relation to said locator surface of said locator block; and
  - drive means for extending and retracting said clamp wedge; and
- a grinder comprising;
  - a grinding wheel; and
  - a grinder table;
- wherein said fixture apparatus is mounted to said grinder table and is traversed past said grinding wheel such that said grinding wheel grinds a surface of said cutting insert.

20. The system as claimed in claim 19 further comprising a control means for controlling said drive means.

21. The system as claimed in claim 20 wherein said drive means is a pneumatic cylinder and wherein said control means is a pneumatic controller.

22. The system as claimed in claim 19 wherein said grinder table is a rotary grinder table and wherein a plurality of fixture apparati are mounted to said rotary grinder table in a substantially circular arrangement.

23. The system as claimed in claim 22 wherein said grinding wheel is mounted in substantially perpendicular relation to said rotary grinder table and wherein said plurality of fixture apparati are mounted to said rotary grinder table in such that said cutting inserts are disposed along an outer circumference of said grinder table.

24. The system as claimed in claim 23 wherein said fixture apparati are mounted to said rotary table at an offset angle from a radius of said table.

25. The system as claimed in claim 22 wherein said grinding wheel is mounted in substantially parallel relation to said rotary grinder table and wherein said plurality of fixture apparati are mounted to said rotary grinder table in such that said cutting inserts are disposed along an inner circumference of said grinder table.

26. The system as claimed in claim 25 wherein said fixture apparati are mounted to said rotary table at an offset angle from a radius of said table.

27. A system for machining a workpiece, said system comprising:
- a fixture apparatus comprising;
  - a base plate having a top surface, a bottom surface, a front surface, a back surface, a first side wall, and a second side wall;
  - a clamp block extending from said base plate, said clamp block comprising a clamp surface disposed at a first angle from said top surface of said base plate
  - a locator block extending from said base plate, said locator block comprising a locator surface disposed opposite said clamp surface of said clamp block;
  - alignment means for aligning the workpiece relative to the locator surface of said locator surface of said locator block;
  - a clamp wedge disposed between said clamp surface of said clamp block and said locator surface of said locator block, said clamp wedge comprising a top, a bottom, a drive shaft extending from said bottom and through said base plate, a bearing surface disposed against said clamp surface of said clamp block and in substantially parallel relation to said drive shaft, and a wedge surface disposed at a second angle relative to said bearing surface, said second angle being complimentary to said first angle of said clamp surface of said clamp block such that said wedge surface is disposed in substantially parallel relation to said locator surface of said locator block; and
  - drive means for extending and retracting said clamp wedge; and
- a machine tool comprising a work table to which said fixture apparatus is mounted.

* * * * *